United States Patent [19]

Roberts

[11] Patent Number: 4,471,233

[45] Date of Patent: Sep. 11, 1984

[54] EMERGENCY POWER SYSTEM

[75] Inventor: Bradford P. Roberts, Costa Mesa, Calif.

[73] Assignee: Emergency Power Engineering, Inc., Costa Mesa, Calif.

[21] Appl. No.: 406,341

[22] Filed: Aug. 9, 1982

[51] Int. Cl.³ .............................. H02J 7/02; H02J 9/06
[52] U.S. Cl. .......................................... 307/66; 307/87
[58] Field of Search ................................ 307/64–67, 307/43–46, 85–87; 361/82, 84; 365/201, 229

[56]  References Cited

U.S. PATENT DOCUMENTS

| | | | |
|---|---|---|---|
| 539,019 | 5/1895 | Chamberlain | 171/97 |
| 2,194,822 | 3/1940 | Dannheiser | |
| 2,725,489 | 11/1955 | Van Weynsbergen et al. | 307/67 |
| 3,050,635 | 8/1962 | Tanner | 307/64 |
| 3,178,632 | 4/1965 | Woodson et al. | 322/4 |
| 3,243,598 | 3/1966 | Grillo | 307/68 |
| 3,514,625 | 5/1970 | Lane | 307/67 |
| 3,665,495 | 5/1972 | Carter et al. | 307/67 |
| 3,986,098 | 10/1976 | Tamii et al. | 307/66 X |
| 4,104,539 | 8/1978 | Hase | 307/66 X |
| 4,167,680 | 9/1979 | Gross | 307/66 |
| 4,203,041 | 5/1980 | Sachs | 307/67 |

FOREIGN PATENT DOCUMENTS 1584396  2/1982  United Kingdom ................. 307/67

Primary Examiner—Joseph W. Hartary
Assistant Examiner—Todd E. De Boer
Attorney, Agent, or Firm—Gausewitz, Carr, Rothenberg & Edwards

[57]  ABSTRACT

A motor generator set that is used to provide clean, noise-free power to a load, such as a computer, is upgraded to a complete uninterruptible power supply by the addition of a logic controlled, battery powered inverter that is readily connected in the main power supply line to the motor generator. The emergency power inverter operates only when normal utility power fails, and employs the ability of the motor generator set to handle brief power outages to power the load for the brief time needed to decouple the main line power supply and couple the inverter to the motor generator. An oscillator that clocks trigger pulses for the inverter tracks motor voltage frequency and phase until power is supplied to the motor from the standby inverter. Switching to the emergency power inverter is accomplished by detecting both reverse power and zero current.

7 Claims, 9 Drawing Figures

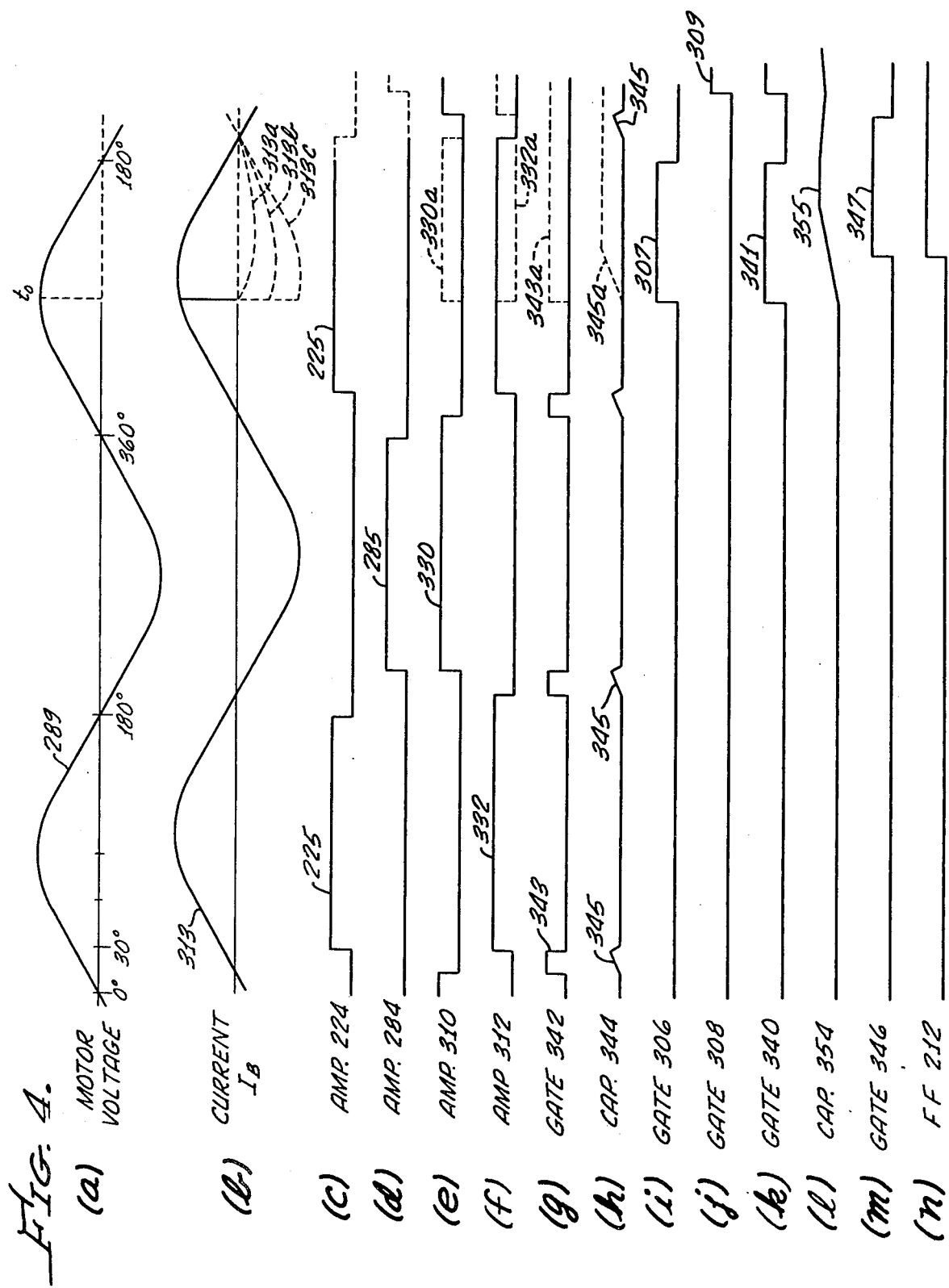

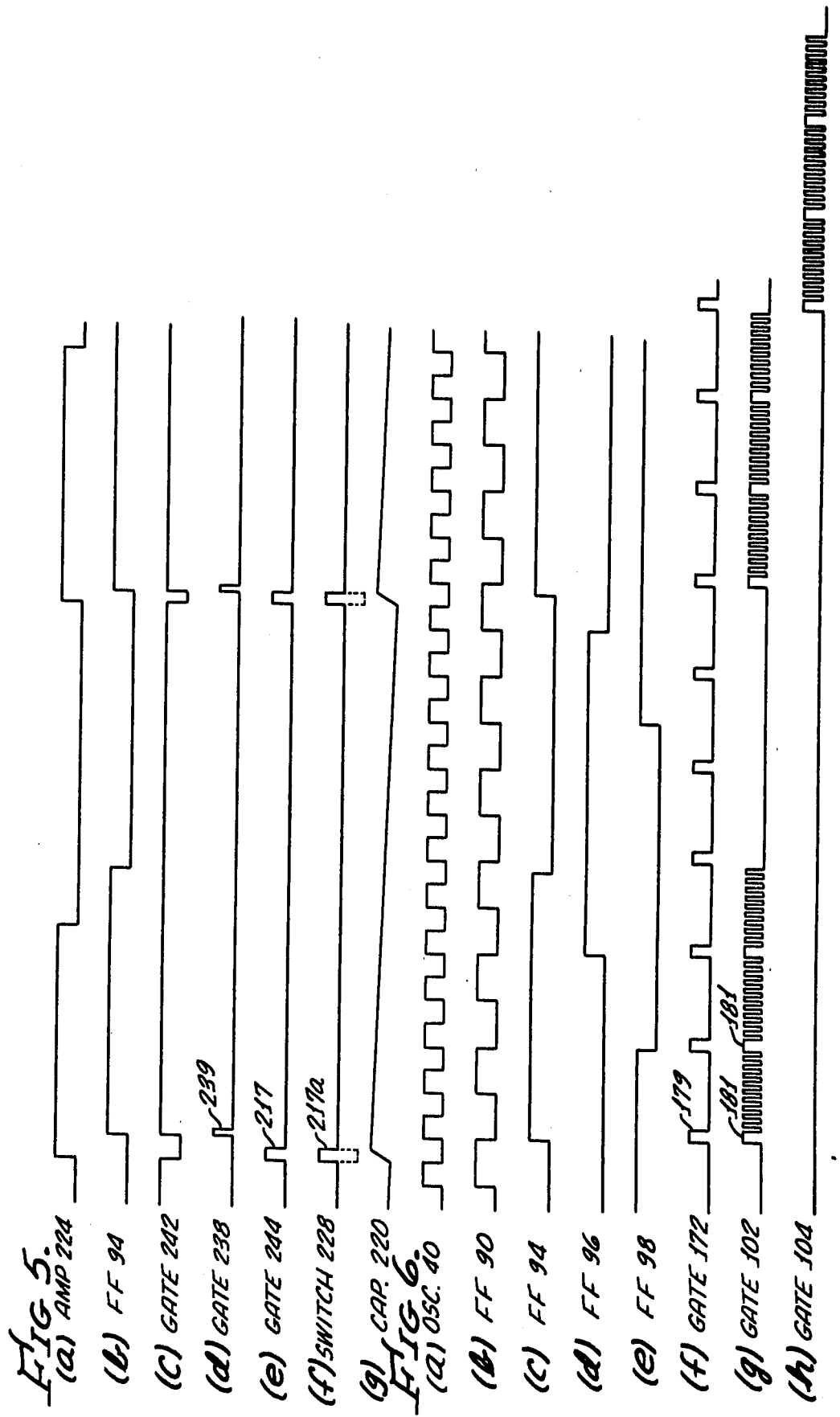

(a) GATE 102

(b) DRIVER 114

(c) POINT 422

(d) GATE CURRENT

EMERGENCY POWER SYSTEM

This application is related to a co-pending application of Lawrence E. Henderson for Emergency Power System and Logic Therefor, filed Aug. 9, 1982, Ser. No. 406,348, assigned to the assignee of the present application.

BACKGROUND OF THE INVENTION

The present invention relates to power supplies and more particularly concerns off-line, standby power supplies.

Development and application of computer technology has created a demand for a variety of power protection devices ranging from high isolation transformers to large scale uninterruptible power supply systems. For many years, the basic system for providing a buffered or protected AC power supply was a simple motor generator set. An example of such a buffered supply is the power conditioning system employing a motor generator set that is sold by the assignee of the present invention under the name POWERBLOC. Use of a motor generator set has proven to be a reliable method of protecting a computer from harmful effects of voltage fluctuations and brief power outages. The motor generator set provides isolation of the load from electrical noise and power protection during outages up to about five seconds in duration. However, for those systems, including many large scale computers, that require protection from power outages of greater duration, an alternate or emergency power supply is required to provide power for a period long enough to generate an alarm and allow the operator to shut down or otherwise protect the load from power loss. Various types of emergency power or uninterruptible power supply systems have been employed, but these commonly require on-line operation of all or at least major portions of the auxiliary system. For example, a system has been employed in which a rectifier and inverter are series connected in the main power supply to the motor generator that drives the load, with the inverter being operable by an auxiliary battery for emergency power. The relatively low efficiencies of the inverter and rectifier, which must operate continuously in such prior arrangement, are wasteful of energy. The on-line system is more costly and has decreased reliability because of its required continuous operation. Even an off-line, standby inverter is inefficient and wasteful of energy if it must operate during normal power operation.

Installation of a power conditioning system having an uninterruptible power supply of a size sufficient for a given load requirement may be a factor limiting expansion of the load. An increase in the power required by the load (by the addition of other computers, for example) may require the uninterruptible supply system to provide power beyond its capacity. Therefore, increased load may require use of a larger substitute or an additional uninterruptible supply system with significantly increased cost, inefficiency and reliability problems. Frequently, an original, relatively smaller uninterruptible power supply must be replaced with a larger system to allow expansion of load power requirement. There are no known emergency standby power systems that can be readily and inexpensively retrofitted to existing motor generator power conditioning systems, nor which operate as true standby systems wherein a normally nonoperating inverter is driven only during main line power outage.

Accordingly, it is an object of the present invention to provide an emergency power system that avoids or minimizes above-mentioned problems.

SUMMARY OF THE INVENTION

In carrying out principles of the present invention in accordance with a preferred embodiment thereof, a standby power system, capable of being readily retrofitted into an existing motor generator power conditioning system, employs a standby, normally non-operating battery powered inverter and logic controlled switches that operate when main line power fails to disconnect the motor generator from the main line, to start operation of the inverter, and to couple the inverter to the motor generator. The short period power outage protection afforded by inertia of the motor generator set provides protection for the load during the time required to start up the inverter and to switch power supply from the main line to the inverter output.

BRIEF DESCRIPTION OF THE DRAWINGS

FIGS. 4, 5 and 6 comprise timing diagrams pertinent to the circuit of FIGS. 3a and 3b;

DETAILED DESCRIPTION

Figure 1:
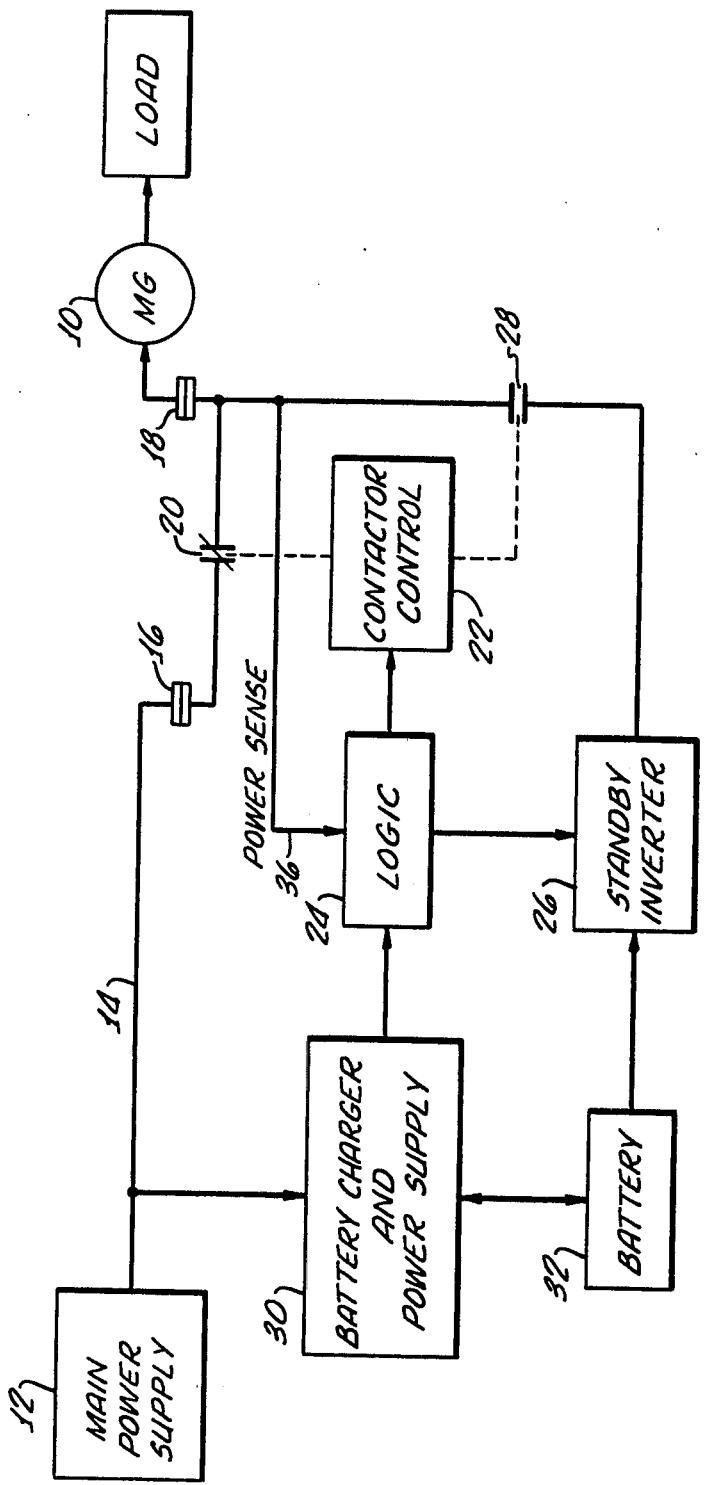
FIG. 1 is a functional block diagram of a motor generator driven load having a retrofitted standby emergency power system embodying principles of the present invention.

As illustrated in FIG. 1, a load to be protected, which may be a computer or other system that requires a power supply protected against outages for a period of ten to fifteen minutes, is driven by a power conditioning system, including a motor generator set 10, from a main power supply 12, which may be a common sixty cycle, 110 or 220 volt three phase supply. Main line power from the supply is fed by a power line indicated at 14, which represents the several lines of the conventional three phase power supply. For application of an emergency system to be established power supply, the existing power supply line at the input of the motor generator set is severed, and an emergency standby power system embodying principles of the present invention is connected in series in the line between connecting lugs 16, 18. During normal operation, power from line 14 flows through a pair of closed normal contacts 20 directly to the motor generator. Contacts 20 are normally closed by energization of contactor control 22, which in turn is controlled by a logic circuit 24. Emergency power is provided from an inverter 26 through emergency contacts 28 which are operated by the contactor control 22.

A battery charger and power supply 30, which may derive power from the main line, provides a trickle charge to a battery 32, and also provides power for operation of the logic circuit 24. The battery provides power to the logic circuit and inverter for emergency operation. Main line power failure is sensed via line 36, connected to the power supply lines between the normal contacts 20 and the motor generator, and detected by reverse power and zero current circuits in logic circuit 24.

In normal operation, power flows from the main power supply line 14 through closed normal contacts 20, and thence to the motor generator set 10 which supplies the load. The inverter, which comprises a substantially conventional circuit having pairs of silicon controlled rectifiers (SCR), is disabled by the logic circuit, which provides no drive for the SCR electrodes. Emergency contacts 28 are open. The inverter SCR's draw substantially no current during normal power supply operation.

Upon failure of the main power supply, the motor of the motor generator set may act as a generator to produce a reverse power flow to other equipment in the building, if the failure does not disconnect other equipment from the line 14. If such other equipment is not connected to the main line, reverse power will not flow from the motor, upon power failure, and there will be no current flow. Upon sensing either reverse power or zero current, the logic circuit starts operation of the inverter and operates the contactor control to open normal contacts 20 and to close emergency contacts 28. This disconnects the motor generator from the main line 14 and provides power from the inverter to the motor generator.

Because the SCR's of the inverter are normally not operating, a small, but finite time is required to start the inverter. Moreover, opening of the main line normal contacts 20 and closing of the emergency contacts 28 also requires a small, but finite time. However, the motor generator, because of the inertia of its components, continues to supply power for as much as several seconds, even though its frequency decreases and its voltage begins to decay upon failure of the main power supply. Accordingly, the motor generator provides a temporary or ride-through power, after failure of the main supply, that is significantly greater than the total of approximately 40 to 80 milliseconds required to switch the standby power system into operation. During emergency operation, the battery supplies power to the inverter and to the logic circuitry to continue inverter operation and to enable sensing of return of power to the main line. Upon return of main line power, emergency contacts 28 are opened and normal contacts 30 are closed to put the system back in its normal operation, with the inverter on standby and the inverter SCR's drawing no current.

Figure 2:
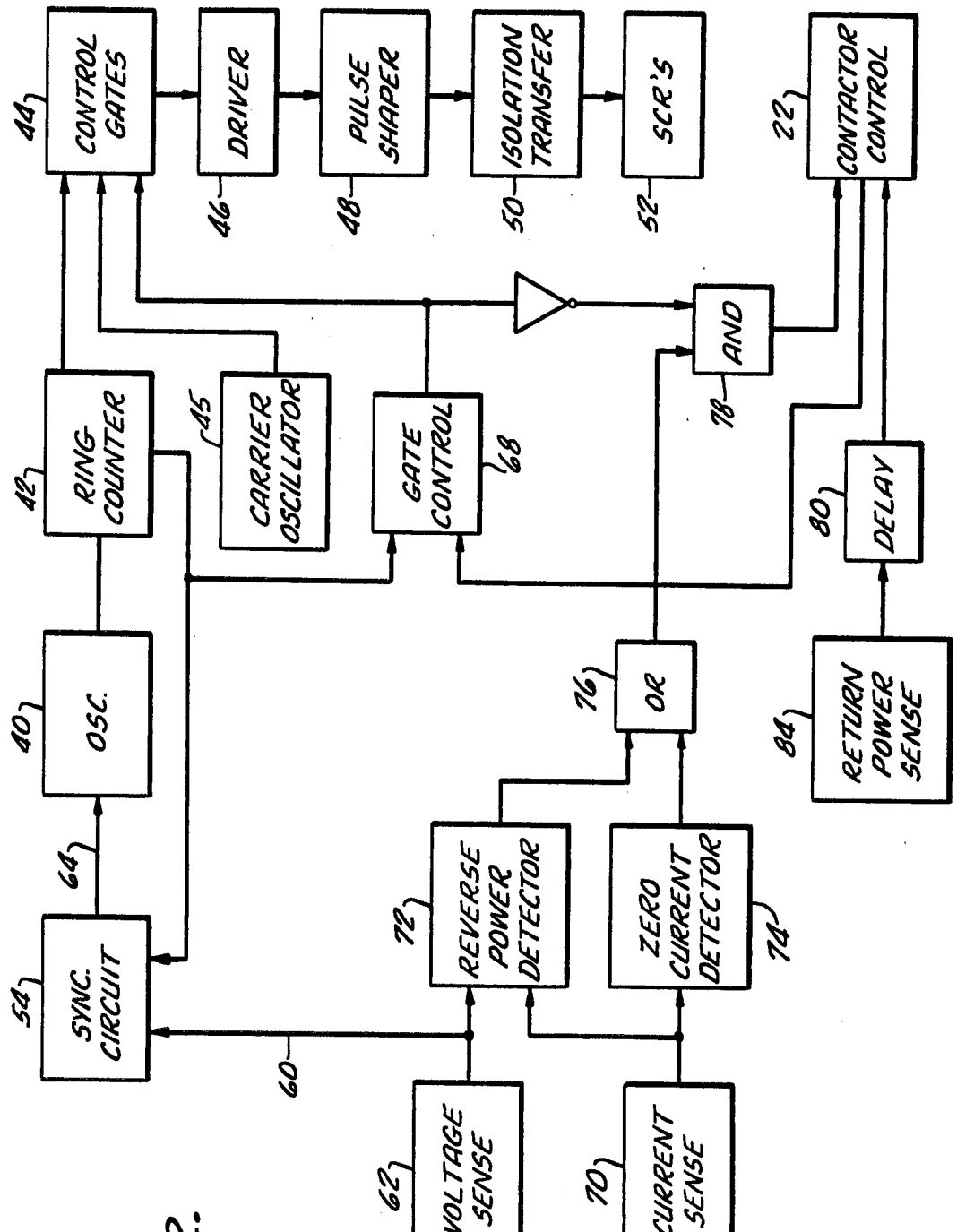
FIG. 2 comprises a block diagram of the logic control of the emergency power system of FIG. 1.

Illustrated in FIG. 2 is a block diagram of logic circuit 24 of FIG. 1. A free running gating and timing oscillator 40, established to have a natural frequency of approximately six times the frequency of the line voltage, triggers a modulo three ring counter 42 which sends plus and minus three phase SCR gating signals to a group of control gates 44. Gates 44, when enabled, pass trigger pulses from a carrier oscillator or trigger generator 45 through a driver 46, a pulse shaper 48 and an isolation transformer 50 to a set of six inverter SCR's indicated at 52. Phase and frequency of the gating oscillator 40 is controlled by a synchronizing circuit 54 which compares a signal representing one count or phase of the ring counter 42 with a motor voltage signal provided on a line 60 from a motor voltage sensing circuit 62 to produce an oscillator frequency control signal on a line 64 that varies the oscillator frequency to cause the ring counter to track the phase and frequency of the motor voltage.

During normal power line operation, the ring counter and both oscillators operate, but the inverter SCR's are not triggered, because no triggering signal is applied through the control gates 44, which are disabled. The control gates are normally disabled by the output of a standby/run coincidence gate 68 which is enabled by actuation of the contactor control 22 and the occurrence of a selected count of the ring counter. Accordingly, upon power failure, triggering of the inverter SCR's is initiated at a selected point in the ring counter cycle.

Oscillator phase and frequency synchronization, and, therefore, inverter synchronization, is provided to minimize inrush current, namely, the amount of current required when the inverter is initially coupled to the motor. This enables use of a much smaller capacity standby system which does not have to be large enough to supply the significantly greater inrush current that would be required without synchronization of phase and frequency. The phase and frequency tracking ensures that when the inverter initially provides power to the motor, the inverter power will be at the then existing and slightly decreased motor voltage frequency and also will be in phase. The synchronization is disabled during emergency operation (as will be described below), upon coupling of the inverter to the motor, and the inverter and motor are operated at a frequency defined by the unsynchronized oscillator.

In order to initiate switching of the system into emergency operation, motor voltage sensing circuit 62, which is connected to two of the three phases of the power line 14, and a current sensing circuit 70, which is connected to the lagging of one of the two phases used by voltage sensing, have their outputs fed to a reverse power detector 72 and a zero current detector 74, which provide outputs respectively indicative of reverse power and zero current. Via an OR gate 76, either one of these failure signals is caused to trigger contactor control 22 through a coincidence circuit 78 that is enabled by the inverted output of standby/run gate 68 which also enables the SCR control gates 44. During normal operation, the output of gate 68 disables the inverter control gates 44 and enables contactor control gate 78. Upon failure, control gates 44 are enabled in synchronism with a selected phase of the ring counter. Accordingly, the inverter starts its operation in synchronism with the ring counter.

Contactor control 22 is also operable in response to an output from a time delay circuit 80 which initiates a predetermined time delay interval, which may be several seconds, upon occurrence of a signal from a sensing circuit 84 connected to one of the phases of the main power to indicate return of power to the main line.

In the absence of return of main line power, the standby emergency power supply system continues to supply power from the inverter to the motor of the motor generating set until the battery runs down. Generally, an emergency operating time of ten to fifteen minutes is adequate. If failure of the main line is corrected before the battery runs down, return of power is sensed to initiate the time interval of delay circuit 80, which accounts for spurious return signals, and, at the end of such delay, to deactivate contactor control 22, so as to disconnect the inverter from the motor and to couple the main power line to the motor. Deactivation of contactor control 22 disables gate 68 and control gates 44 to place the inverter SCR's in standby condition.

CIRCUIT DETAILS

Figure 3A:
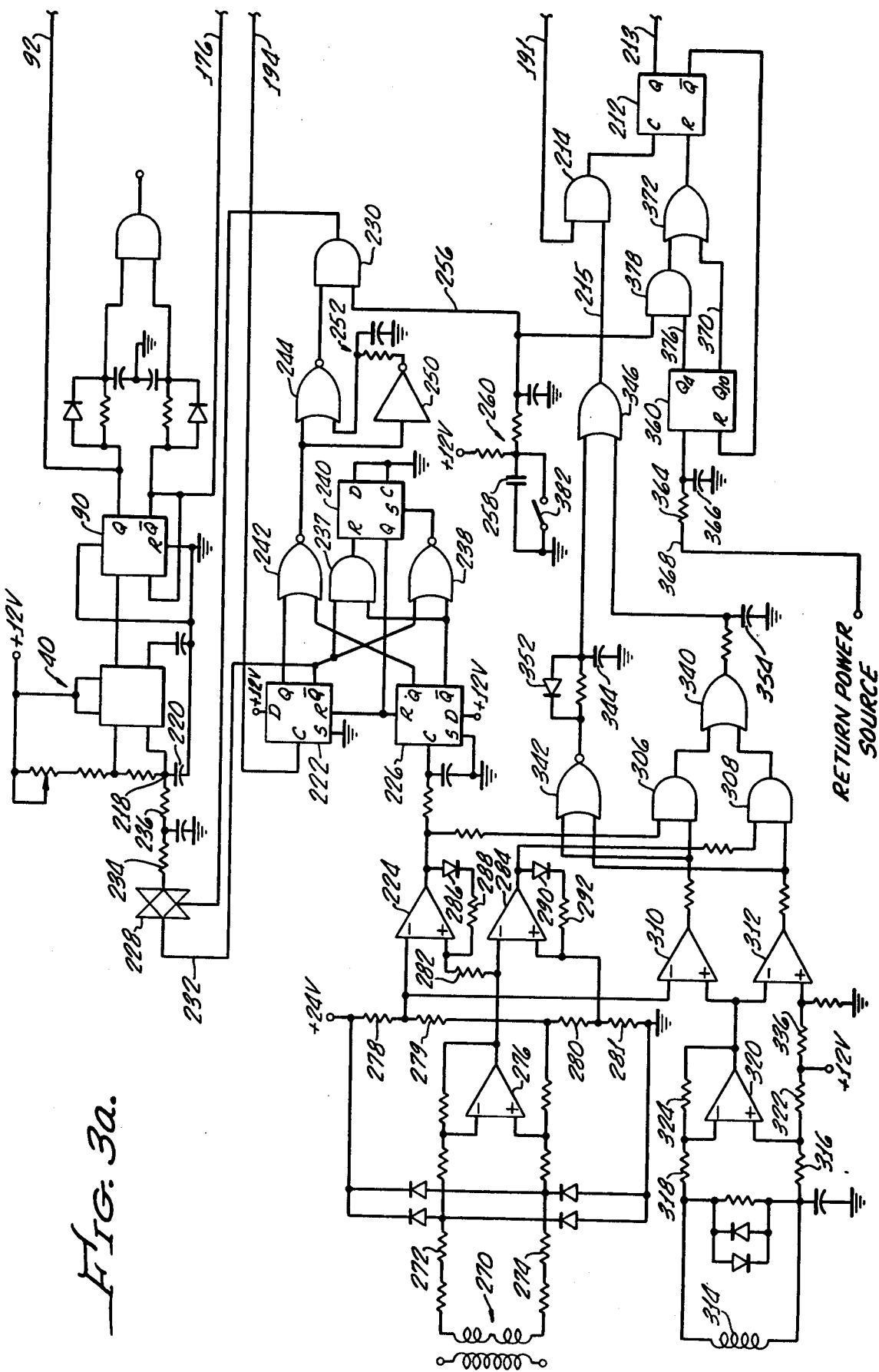
FIGS. 3a and 3b comprise a circuit diagram of the logic control.
Figure 3B:
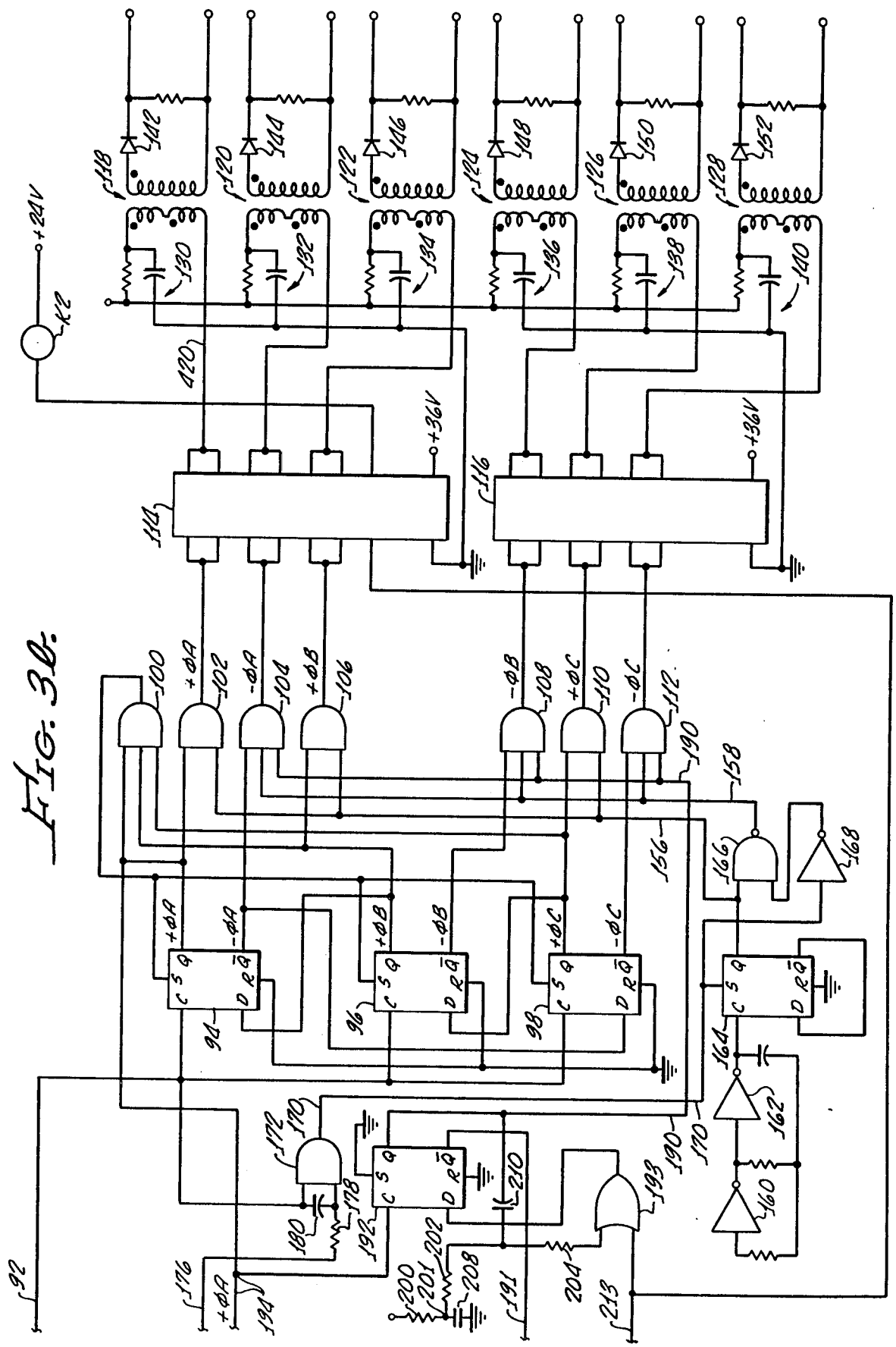

Logic circuit details are shown in FIGS. 3a and 3b which form a single complete circuit when FIG. 3a is placed to the left of FIG. 3b. Oscillator 40 (FIG. 3a) is arranged to have a natural frequency of about six times the line frequency and drives a divide by two flip-flop 90 which generates a series of clock pulses on a line 92 to clock each of three flip-flops 94, 96, 98 (FIG. 3b) connected as a modulo three ring counter that collectively provide the gating pulses which gate carrier oscillator generated triggering pulses that are shaped for driving the inverter SCR's. Oscillator, clock and exemplary gating pulses are shown in FIGS. 6a through 6e.

The three flip-flops of the ring counter produce, respectively, plus phase A and minus phase A from flip-flop 94, plus phase B and minus phase B from flip-flop 96 and plus phase C and minus phase C from flip-flop 98.

The six outputs of the ring counter flip-flops provide timing and gating for SCR trigger pulses that are provided from a carrier oscillator. The ring counter gating pulses are each fed as one input to a respective one of coincidence gates 100, 102, 104, 106, 108, 110 and 112. The gate outputs provide the SCR trigger pulses, which are fed via drivers 114 and 116 to the secondary windings of isolation transformers 118, 120, 122, 124, 126 and 128 having the signal inputs to their primary windings shaped by pulse-shaping RC networks 130, 132, 134, 136, 138 and 140, respectively. Secondary windings of the respective transformers have their opposite ends connected to respective ones of the six SCR's (not shown in FIG. 3) of the inverter via steering diodes 142, 144, 146, 148, 150 and 152, respectively. Gates 102, 106 and 110, when enabled, pass SCR trigger pulses provided by a carrier signal on a line 156, and gates 104, 108 and 112, when enabled, pass the inverse of the carrier signal trigger pulses on a line 158. A carrier oscillator, formed of interconnected inverting amplifiers 160 and 162, provides a carrier clock signal of a high frequency, in the order of 10 to 100 kHz, to the clock input of a carrier flip-flop 164 of which the Q output is connected to carrier trigger pulse line 156 and, via an inverting AND gate 166, to the inverse carrier trigger pulse line 158. Gate 166 has a first input from the flip-flop 164 and a second input from an inverting amplifier 168. The carrier flip-flop 164 is set and held set by an extended synchronizing pulse signal 179 (FIG. 6f) on a line 170 from the output of an AND gate 172 which has a first input on line 92 from the system clock pulse flip-flop 90 and a second input on line 176 via a resistor 178 from the $\bar{Q}$ output of the clock pulse flip-flop. A capacitor 180 interconnects the two inputs of gate 172, whereby the latter provides an output on line 170 that is synchronized with the clock pulses, and is of a significantly extended duration. The clock pulses from flip-flop 90 are of a much lower repetition rate than the pulses fed to the clock input of carrier flip-flop 164 from the carrier oscillator. Each extended duration clock pulse on line 170 in effect disables the clocking of the carrier flip-flop from the carrier oscillator. Thus, the flip-flop provides an initial pulse 181 of extended duration upon occurrence of each extended duration pulse from gate 172, and each such initial pulse is followed by many shorter period pulses, as shown in FIG. 6g.

The carrier trigger pulses that are gated through gates 102 through 112 during the individual SCR turn on times, which are controlled by the gate signal outputs of the ring counter flip-flops, include the relatively long extended duration initial pulse 181 of approximately 150 microseconds, which is a duration long enough to ensure initial conduction of the SCR. This extended duration pulse is followed, within the time interval of each SCR gate signal, by the relatively short pulses, each having a duration in the order of about 10 microseconds, that are provided to ensure continued conduction of the SCR during its entire gate interval. In the exemplary embodiment this gate interval may be approximately 8.3 milliseconds.

Negative phase SCR control gates 104, 108 and 112 each has an inverter standby/run input on line 190 from the Q output of an inverter standby/run flip-flop 192 that is clocked by the signal on line 194 from the plus phase A output of ring counter flip-flop 94. A positive supply is fed to the D input of standby/run flip-flop 192 via a resistive network 200, 202 and 204, and an OR gate 193. The junction 201 of resistors 200 and 202 is connected to a set of normal contacts 208. Contacts 208 are closed during normal operation, to provide a low (ground) signal to the D input and hold the run signal on line 190 from flip-flop 192 low, thereby to disable gates 104 (see FIG. 6h), 108 and 112. The second input to OR gate 193 is an emergency signal derived from the Q output of a contactor control flip-flop 212 (FIG. 3a) via a line 213. Upon sensing of zero current or reverse power, as will be described below, the emergency signal on line 213 goes high to allow the standby/run flip-flop to be clocked on the next plus A pulse on line 194.

Contactor control flip-flop 212, which is reset during normal operation, with its Q output low, is clocked to set condition, by the output of an AND gate 214 of which a first input on a line 215 is the failure sense signal to be described below. A second input to gate 214 is the $\bar{Q}$ output of the standby/run flip-flop 192 which is high during normal operation and goes low when the flip-flop is set by the emergency signal on line 213. Accordingly, after control flip-flop 212 is set, its clock input is disabled by the $\bar{Q}$ output of the standby/run flip-flop. When the latter is set, its high Q output is fed back to its D input via a capacitor 210 to ensure holding a high at the D input, which avoids possible resetting that may be caused by bounce of contacts 208. Upon the sensing of either reverse power or zero current, by circuits to be described below, control flip-flop 212 is set and the emergency signal on line 213 is fed via driver 114 to energize a switching control relay coil K2 that opens the normal contacts and closes the emergency contacts.

Upon setting of control flip-flop 212 and occurrence of the plus phase A SCR gate pulse on line 194 to clock flip-flop 192, the output of the latter, on line 190, goes high to enable the minus phase gates 104, 108 and 112 and thereby enable all of the inverter SCR's. During normal operation, the minus SCR gates 104, 108 and 112 are disabled by the low on line 190, whereby all six SCR's of the inverters are disabled.

INVERTER SYNCHRONIZATION AND TRACKING

When utility line power fails, the motor acts as a generator and produces a feedback voltage whose frequency is dependent upon the product of the number of motor poles and the number of revolutions per second of the motor rotor. Initially, this motor feedback voltage is equal in magnitude, phase and frequency to the voltage on the utility line, but begins to diminish in magnitude and frequency upon failure of power. When the standby power is switched in to drive the motor, it must be as close as possible, in both phase and frequency, to the motor feedback voltage. The greater the discrepancy at the time of coupling the inverter to the motor, the greater the amount of inrush current required of the inverter. The inverter would have to furnish as much as twelve times the normal operating power in the absence of synchronization. A significant difference in frequency and phase may result in overloading a smaller inverter to the point where it is not able to supply the required motor drive signals, or where it may be destroyed. If phase and frequency of the inverter power differ from phase and frequency of the motor voltage, inverter capacity must be greatly increased merely to accommodate the current demanded during switching to the emergency system. Minimizing the inrush current enables use of a smaller standby system of much less capacity.

To minimize inrush current, and therefore to minimize excessive loads upon a relatively smaller inverter, a synchronizing circuit is provided that has three functions. First, it continuously compares inverter and power line signals to maintain the inverter gating and triggering pulses closely synchronized in phase and frequency to the power line during normal operation. Second, the circuit causes the inverter gating and triggering pulses to track the motor voltage in phase and frequency upon failure of the power line, during the time interval between failure of the utility line and connection of the inverter to the motor. Third, it maintains the phase and frequency of the ring counter and oscillator close to the motor phase and frequency at the time that the inverter assumes the motor load.

The synchronizing or oscillator tracking circuit, FIG. 3a, provides a high or low voltage pulse 217a (FIG. 5f) to input 218 of the oscillator 40 to control the voltage on an input capacitor 220 (FIG. 5g) and change the oscillator frequency. A single high or positive pulse increases the capacitor charge and the oscillator frequency by a predetermined amount, and a number of such high pulses successively increase oscillator frequency. Similarly, a series of low or negative pulses repetitively decrease oscillator frequency.

For oscillator tracking, motor voltage is compared with the plus phase A SCR gate signal, line 194, from the output of ring counter flip-flop 94. The plus phase A signal is fed to the clock input of a first comparison flip-flop 222. The motor voltage signal from a differential amplifier 224 of the reverse power detector 72, to be described in detail below, is similarly fed to the clock input of a second comparison flip-flop 226. The $\bar{Q}$ outputs of both flip-flops 222 and 226 are fed to an AND gate 237 and a NOR gate 238 of which the outputs are fed to reset and set inputs, respectively, of a flip-flop 240 having its Q output connected to reset both flip-flops 222 and 226. Accordingly, when the comparison flip-flops are clocked one after the other, upon clocking of the second one to be clocked, NOR gate 238 provides a pulse 239 (FIG. 5d) to set flip-flop 240 and reset flip-flops 222 and 226. The $\bar{Q}$ output of flip-flop 222 is fed to the signal input 232 of an analog switch 228, which is gated on or off by a signal 217 (FIG. 5e) at its control input from the output of an AND gate 230 (from gate 244) so as to pass a high level pulse 219 (FIG. 5f) to the oscillator when flip-flop 222 is reset and its $\bar{Q}$ output is high, or to pass a low level pulse to the oscillator when the flip-flop is set. Analog switch 228 provides a very high resistance between its signal input 232 and its output, in the absence of a control input from gate 230. When the switch is operated by a control signal, its input is fed via resistors 234 and 236 to the frequency controlling input of oscillator 40.

Either of the flip-flops 222 or 226 is arranged to control the analog switch by means of NOR gates 242 and 244 and AND gate 230. The Q outputs of both flip-flops are fed as inputs to NOR gate 242. The output of gate 242 is fed as one input to NOR gate 244 and also as an input to an inverting amplifier 250. An RC delay network 252, connected to the output of the inverting amplifier, controls termination of the output of gate 244 and provides a second input to the gate. The normally low output of inverting amplifier 250 remains low for a short time after the pulse from gate 242 goes low so that gate 244 provides a short high output that is positively terminated when the RC circuit 252 allows its capacitor charge to rise to the threshold of gate 244. The output of NOR gate 244 is fed as one input to AND gate 230, which is enabled by a second input on a line 256 from an enable phase tracking circuit 260.

The enable phase tracking circuit 260 provides either a fixed positive potential, when the system is running normally, and contacts 258 are open, or a disabling ground signal, when the contacts 258 are closed. Contacts 258 operate with emergency contacts 28 (FIG. 1), being open during normal operation and the first part of switching to emergency power, and being closed during failure. Accordingly, upon failure of main power, circuit 260 provides a low input to gate 230 which disables the synchronization and tracking by disabling analog switch 228.

If line power frequency decreases or if, upon failure, the motor slows and voltage decays, the plus phase A SCR signal advances relative to the motor voltage signal, and the oscillator frequency must be decreased in order to decrease the difference in phase and frequency between motor voltage and SCR drive. When flip-flop 222 is clocked before flip-flop 226 is clocked (plus phase A SCR leads), the $\bar{Q}$ output of flip-flop 222 to switch input 232 is low when the analog switch is gated on, and a negative pulse is passed through the switch 228 to decrease oscillator frequency. If the motor voltage signal leads (line power frequency increases) so that flip-flop 226 is toggled before flip-flop 222 is clocked, the analog switch is also gated on, but the $\bar{Q}$ output of flip-flop 222 on line 232 is still high, and a positive pulse, commanding an increased oscillator frequency, is switched to the oscillator.

If flip-flop 222 is toggled first during normal operation, it provides a positive input to NOR gate 242 which still has a negative input from flip-flop 226. Gate 242 thus provides a negative input to NOR gate 244, and thence a positive input to AND gate 230. If contacts 258 are open and the system is in normal operation, gate 230 provides a positive pulse to open the analog gate and pass the low signal from the $\bar{Q}$ output of flip-flop 222. Termination of the output pulse of AND gate 230 is controlled and ensured by inverter 250, which provides a positive pulse, delayed by the RC circuit 252, to the second input of NOR gate 244 to cause the output of the latter to drop, and thereby to terminate the positive analog switch closing control input pulse 217 (FIG. 5e).

If flip-flop 226 is clocked first (line voltage leads SCR gate pulse), gates 242, 244 and 230 produce a pulse to operate the analog gate (prior to switching to emergency power), but flip-flop 222 is still reset and the analog gate input is high, to command an increase in oscillator frequency.

REVERSE VOLTAGE AND ZERO CURRENT SENSING

A reverse voltage sensing transformer 270 (FIG. 3a) has its primary winding connected to two phases, such as phases A and B of the main power line, and its secondary connected to motor sensing resistors 272, 274 which provide inputs to inverting (negative) and non-inverting (positive) inputs of a differential amplifier 276 that is biased by resistors 278–281 from a 24-volt supply so as to hold its positive input at 18 volts and to cause its output to vary between a negative peak of 0 volts and a positive peak of 24 volts, having a zero crossover of 12 volts. Output of differential amplifier 276 is fed via a resistor 282 to the non-inverting input of a second differential amplifier 224 and also to the inverting input of a third differential amplifier 284, which form part of the reverse power detector 72 (FIG. 2). The negative input of amplifier 224 is held at 18 volts, and a unidirectional feedback path is provided by diode 286 and resistor 288 from its output to its non-inverting input to provide at the output of amplifier 224 a pulse 225 (FIG. 4c) that is positive between about 30° and 180° of the motor voltage signal 289 illustrated in FIG. 4a. As the positive going half cycle of voltage signal 289 reaches a point about 30° beyond its zero crossover, the output of amplifier 224 goes positive. The output of amplifier 224 returns to its low at the zero crossover of signal 289.

In a similar manner, differential amplifier 284 has its positive input biased at 6 volts and its output fed back via a unidirectional feedback path comprising diode 290 and resistor 292 to its positive input, so that the output pulse 285 (FIG. 4d) of the amplifier 284 is positive between about 210° and 360° of the motor voltage signal 289. When the negative going half cycle of the output of differential amplifier 276 drops below the fixed bias at the negative input of amplifier 284, the output of the latter goes positive and remains positive until the next positive going zero crossover.

The output of amplifier 224 is used in the synchronizing or tracking circuit comparison to clock flip-flop 226, as described above. If deemed necessary or desirable, one or more inverting amplifiers (not shown) may be interposed between the output of amplifier 224 and the clock input of flip-flop 226 to increase and sharpen the clocking signal. The outputs of both amplifiers 224 and 284 are fed as one input to each of AND gates 306 and 308, each receiving a second input from a respective one of differential amplifiers 310 and 312.

Current signal 313 (FIG. 4b) is sensed by a coil 314 inductively coupled to the second (lagging) of the two phases used for sensing voltage. In FIG. 4 waveforms are shown in solid lines for normal operation and in dotted lines for emergency operation. Power failure is assumed at time $t_0$. Thus, the current waveform 313 reverses at $t_0$ and is shown after failure as any one of current waveforms 313a–313c. Coil 314 is coupled via resistors 316 and 318 to the non-inverting and inverting inputs, respectively, of a differential amplifier 320 having a positive bias applied to its non-inverting input via a resistor 322 and having a feedback from its output to its negative input via a resistor 324. This arrangement produces a signal at the output of amplifier 320, varying about a 12 volt crossover, when 12 volts is the supply potential applied via resistor 322. Differential amplifiers 310 and 312 are biased to provide positive going pulses 330, 332 (FIG. 4e, 4f) during selected portions of the positive and negative going half cycles of the output of differential amplifier 320. Amplifier 310 has its inverting input held at 18 volts and has its non-inverting input connected to the output of amplifier 320 to provide at the output of amplifier 310 the half cycle pulse 330, which is initiated at about 210° and terminates at about 355° after the zero crossover of the positive going half cycle of the current signal 313. Similarly, amplifier 312, having its non-inverting input biased at 6 volts via a resistor 336 and its inverting input connected to the output of amplifier 320, has a half cycle pulse output 332 that goes positive at about 15° and terminates at about 175° after the positive going half cycle zero crossover. Pulses 330 and 332 reverse polarity with the reversal of current polarity upon power failure. The reverse power pulses are designated 330a and 332a in FIGS. 4e and 4f.

Upon failure, AND gate 306 produces a positive output pulse 307 (FIG. 4i) when the positive half cycle of the reverse power current sense pulse 330a from amplifier 310 is in substantial time coincidence with the positive half cycle motor voltage sense pulse 225 from amplifier 224. Similarly, AND gate 308 produces a positive pulse 309 (FIG. 4j) when there is substantial time coincidence between the negative half cycle reverse power current sense pulse 332a from amplifier 312 and the negative half cycle motor voltage sense pulse 285 from amplifier 284. The outputs of gates 306, 308 are connected to an OR gate 340. A positive pulse from either of the AND gates 306 and 308 produces a high pulse 341 (FIG. 4k) at the output of OR gate 340 to signal reverse power.

The outputs of each of amplifiers 310, 312 are also fed to a zero current sensing NOR gate 342 that provides a short high output 343 (FIG. 4g) when both of its inputs are low or both are high, conditions that occur in normal or reverse power operation. Upon occurrence of a failure with zero current, the positive bias to the negative inputs of amplifiers 310, 312 produce a negative output from each to produce a positive output from gate 342, which charges a capacitor 344 to provide a sustained zero current signal 345a (FIG. 4h). Integrating capacitor 344 will rapidly discharge through a diode 352 to cause the zero sensing circuit to produce short pulses 345 (FIG. 4h) and thereby ignore a zero signal for about 10 degrees of the current signal. This allows the zero current sensing to avoid the zero crossover and to use pulses that are initiated after the crossover.

For normal operation, current and voltage peaks of the line power are nearly of like polarity substantially at the same time, depending upon the motor load and power factor. Upon power failure, with the motor supplying current, the current is reversed and there is a significant phase shift between current and voltage, for both half cycles of each, as indicated at 313a–313c of FIG. 4b. Both AND gates 306 and 308 provide positive outputs 307, 309 (FIGS. 4i, 4j), whereby the motor power reverse signal 341 at the output of OR gate 340 is high. The reverse power signal 341 is integrated by a capacitor 354 to provide an integrated reverse power signal 355 (FIG. 4l). This integrated reverse power signal is fed as one input to an OR gate 346, which has a high zero current signal 345a (if any) fed to its other input from integrating capacitor 344.

It will be seen that amplifiers 224 and 284 produce voltage pulses having a predetermined phase relation to the voltage being sensed, and amplifiers 310 and 312 produce pulses of a phase having a predetermined relation to the phase of current. The logic gates compare the phase relation of the pulses and signal power failure by indicating reversal of power. Importantly, the pulses are delayed by a small part of a half cycle (a few degrees) relative to the zero crossover, and the pulses are integrated to account for time at the crossover when there is no sensing.

It is necessary to sense both current reversal and zero current, for reasons previously described.

If zero current is sensed, NOR gate 342 via integrating capacitor 344 provides a positive signal to OR gate 346. If reverse motor voltage is sensed, OR gate 340 provides a positive signal to the second input of OR gate 346. The output, pulse 347 (FIG. 4m), of OR gate 346 is fed as one input to the coincidence gate 214. As previously described, gate 214 receives a second input from the output of inverter standby/run flip-flop 192 which is clocked by the plus phase A gate signal of the ring counter. Accordingly, in synchronization with the plus phase A gate signal, detection of zero current or reverse voltage will send a clock signal from gate 214 to the clock input of control flip-flop 212, of which the Q output (FIG. 4n) is connected through driver 114 to energize the contactor control relay coil K2.

A return power circuit comprises a counter 360 (FIG. 3a), connected to count pulses received from an RC circuit 364, 366 which integrates the sinusoidal signal provided on a line 368 that is connected to the AC power line. The counter counts power line cycles during normal operation and will begin its count, after a failure, when normal power returns. When the counter has counted a large number of pulses, sufficient to provide a delay of several seconds, it provides a power return signal on an output line 370, which is fed as one input to an OR gate 372, having its output connected to reset control flip-flop 212. The $\overline{Q}$ output of flip-flop 212 is connected to reset the counter 360 and thus to hold the counter inactive during the time that control flip-flop 212 is reset. When flip-flop 212 is clocked into set condition (power failure), its $\overline{Q}$ output goes low and the reset of counter 360 is released so that the counter can commence to count upon return of power.

Counter 360 is also arranged to provide a test fail safe output on a second output line 376, which occurs after a much smaller count, requiring a much shorter time, in the order of a fraction of a second, for example. This provides a first input to a test AND gate 378, which receives its second input via line 256 which is high during normal operation. A test switch 382 is connected to line 256 through resistor network 260 to simulate a failure condition by producing a low signal on the line when the switch is closed. Operation of switch 382 (via connections not shown) also opens the normal power contacts to disconnect the motor generator from the main power supply. The second counter output provides a fail safe operation for the test switch 382. If, upon the momentary operation of the test switch 382, the switching of inverter standby power is not accomplished, contacts 258 will remain open. Line 256, which is momentarily low upon operation of the test switch, goes high upon release of the test switch. After the relatively short interval provided by counter 360, its output 376 enables gate 378 to provide a positive output which will reset control flip-flop 212 to disable the main power switching and connect the motor generator and load through the normal contacts to the main line power supply.

TIMING DIAGRAMS

Illustrated in FIGS. 4, 5 and 6 are timing diagrams showing certain waveforms (which have been referred to above) useful in explaining and understanding operation of the described circuit. The motor voltage signal 289, which is the input to amplifier 276, is shown in FIG. 4a. It will be assumed for purposes of this discussion that an outage occurs at a time $t_0$, at which time the motor voltage will reverse or there will be a zero current. FIG. 4b illustrates motor current 313 and shows by the dotted waveforms 313a, 313b, and 313c different levels of reverse current that may occur upon an outage commencing at time $t_0$. The motor voltage and current waveforms are shown for a typical power factor of 0.67, with the motor under a moderate load. FIGS. 4c, 4d, 4e and 4f illustrate the pulse outputs 225, 285, 330 and 332 of amplifiers 224, 284, 310 and 312, respectively. The pulse output 225 of amplifier 224 starts at 30° past the zero crossover point of the motor voltage and terminates at 180°, whereas the output 285 of amplifier 284 becomes positive at about 210° and terminates at 360°. Similarly, the output 330 of amplifier 312 goes positive at 30° past the zero crossover point of the current waveform 313 and again becomes negative just before the zero crossover point of the current waveform, at about 175°. The output 332 of amplifier 310 goes positive 30° past the current zero crossover, and terminates (goes low) at about 175°, just before the next zero crossover. The output 343 of NOR gate 342, shown in FIG. 4g, provides a positive output when the output of either amplifier 310 or 312 is positive. The output of gate 346 is normally low, and goes high as the charge (345a or 355) on either of capacitors 344 or 354 rises to the threshold level of the gate. Upon occurrence of a failure with zero current, the output 343 of gate 342 becomes positive and remains positive (343a, FIG. 4g), thus providing a positive input to OR gate 346 via the capacitor 344, FIG. 4h, which charges to a higher level, as indicated at 345a. Upon reversal of motor voltage, the outputs of amplifiers 310 and 312 reverse, as indicated in dotted lines after time $t_0$, so that the outputs of AND gates 306 and 308 become positive, as indicated in FIG. 4i and 4j. OR gate 346, FIG. 4k, provides the indicated positive going pulse outputs 341, upon reversal, to charge capacitor 354, FIG. 4l, and provide a high input 355 to the OR gate 346, FIG. 4m, which is passed by gate 214 to clock flip-flop 212, FIG. 4n, to provide the emergency run mode.

Shown in FIG. 5a is the output of amplifier 224 (after suitable shaping) which clocks the line voltage flip-flop 226 and, in FIG. 5b, the Q output of flip-flop 94 of the ring modulator phase A which clocks flip-flop 222 of the synchronizing and tracking circuit. As indicated in FIG. 5c, the output of NOR gate 242 becomes negative when the first of flip-flops 222 and 226 is triggered. As the motor voltage slows and voltage decays upon occurrence of an outage, the positive going edge of the output of amplifier 224 moves ahead of the change in frequency, causing the oscillator to be driven to a lower frequency, and thus maintaining the logic at the proper phase with respect to the motor voltage. The $\overline{Q}$ outputs of the flip-flops 222 and 226 are fed via NOR gate 238, FIG. 5d, and via the AND gate 237 to set and reset flip-flop 240 which resets the flip-flops 222 and 226. Thus, each of flip-flops 222 and 226 is reset shortly after the termination of the negative pulse from gate 242. FIG. 5e shows the output of gate 244, the output being of duration limited by inverting amplifier 250 and the RC network 252. The output of gate 244, as previously described, turns on the analog switch 228, unless a signal from emergency contact closure inhibits gate 230. As indicated in FIG. 5f, the output of the analog switch 228 is either a positive or a negative pulse, depending upon the relative timing of its control input from gate 244 (via gate 230) with respect to the clocking of the flip-flops 222 and 226. Between pulses from gate 244, the analog switch acts as an open circuit. Each pulse from the analog switch partly charges (or discharges) capacitor 220, as indicated in FIG. 5g, to provide either an increase or decrease in oscillator frequency.

As shown in FIG. 6a, the output of oscillator 4a is divided in two by flip-flop 90, FIG. 6b, to trigger the ring counter and provide the three gate control signals from the ring counter flip-flops, as shown in FIGS. 6c, 6d and 6e. The extended duration clock pulse 179 from gate 172, which is shown in FIG. 6f, resets the carrier flip-flop 164 so that the high frequency carrier output pulses have a single extended duration pulse 181 coinciding with the initiation of the flip-flop 94 gate pulse that is fed with the other carrier pulses through the control gates (when enabled) of which outputs of gates 102 and 104 are shown in FIGS. 6g and 6h, respectively.

SCR WAVESHAPING

Figures 7, 8:
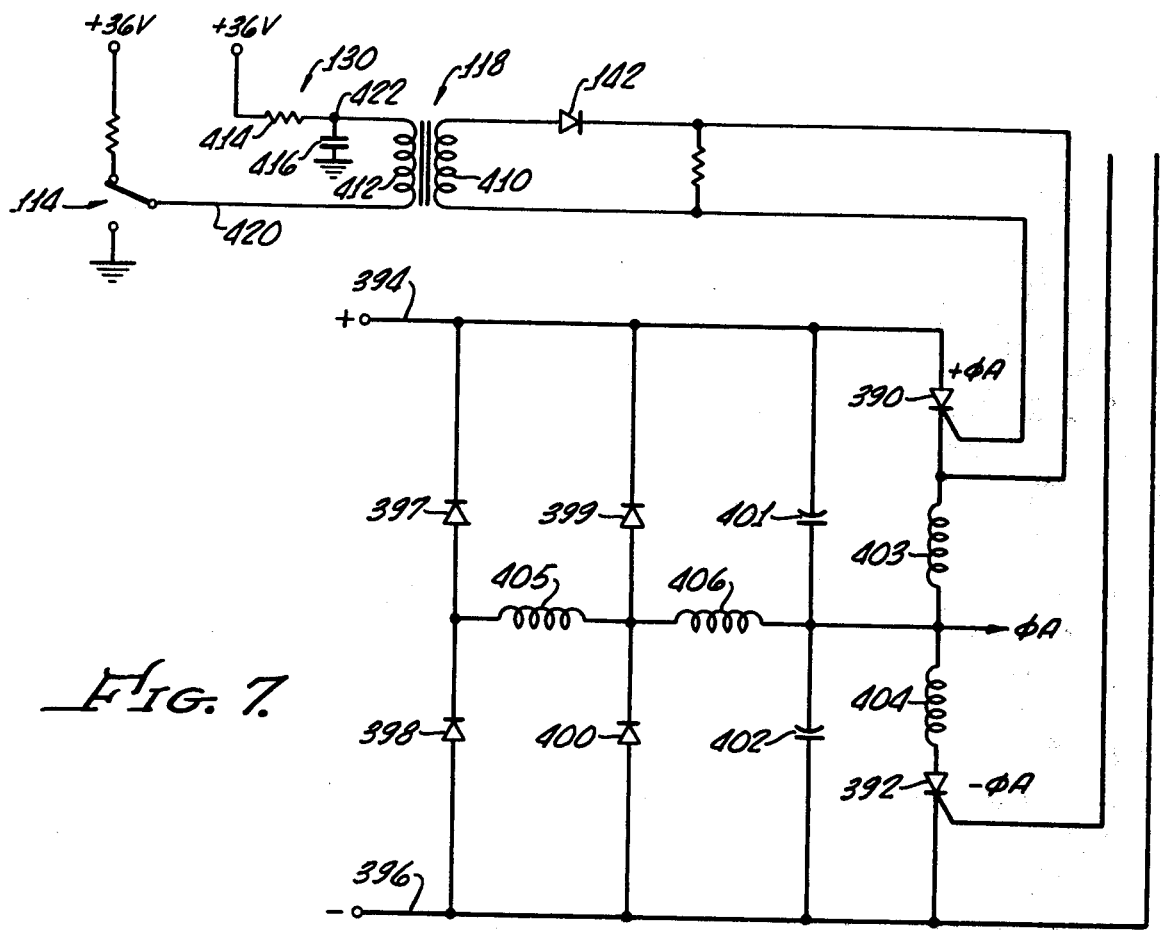
FIG. 7 illustrates details of inverting trigger pulse shaping.
FIG. 8 shows several waveforms of the circuit of FIG. 4.

Illustrated in FIG. 7 are connections of one of the inverter SCR's to driver 114 (schematically illustrated as switch 114) via the gate isolation and wave shaping circuit 130. One phase of the inverter comprises a pair of SCR's 390 and 392 connected between plus and minus dc power lines 394 and 396, in parallel with first and second pairs of series connected diodes 397, 398, 399, 400 and in parallel with capacitors 401 and 402, all connected between the positive and negative lines. Plus and minus SCR's 390, 392 are series connected with coils 403, 404 between the plus and minus lines, and coils 405, 406 are connected between the diode pairs and the capacitors. Gate and cathode electrodes of the plus phase A SCR 390 are connected to opposite ends of the secondary 410 of the isolation transformer 118 with the high speed steering diode 142 connected to pass current of the proper polarity to the SCR gate electrode. Transformer primary winding 412 is connected between a source of +36 V and the driver 114, which is schematically indicated as a switch that selectively connects one end of the transformer primary alternatively to +36 V or ground. RC circuit 130 includes a resistor 414 connected between one terminal of the primary winding and +36 V. A capacitor 416, having one side grounded, has its other side connected to the junction between the resistor and the primary winding.

The arrangement of RC network 130 and isolation transformer 118 provides a most desirable waveshape for turning on the SCR. FIG. 8 illustrates the timing and waveshapes produced by the circuit of FIG. 7. FIG. 8a shows the output of gate 102 (FIG. 3b) which triggers the plus phase A of the inverter. As previously described, the gate passes a series of trigger pulses generated by the carrier oscillator 160, 162. At time $t_0$, when the plus phase A SCR begins to conduct, the first of the trigger pulses goes high to initiate conduction. This first trigger pulse is extended in duration, as previously described. Subsequent pulses are provided at the rate of from 10 to 100 kHz during conduction of the plus phase A SCR until turn off of this SCR, at which time the minus phase A SCR begins conduction. This occurs at time indicated at $t_x$ which is approximately 8.3 milliseconds after $t_0$. When the output of gate 102 goes high at $t_0$, the output of driver 114, on line 420, which normally is at 36 V, goes to ground and remains there until the gate signal drops again. Point 422, the junction between the resistor, capacitor and primary winding of the isolation transformer, is normally high, as indicated in FIG. 8c, and when the output of the driver 114 goes low, the capacitor starts to discharge through the primary winding to ground, sending the desired current through the primary and secondary and thence to the SCR gate electrode. As the capacitor discharges, the voltage at point 422 begins to diminish. When the output of the gate 102 goes low again, at the end of the first or extended trigger pulse, and the driver output goes high, the capacitor starts to recharge and the voltage at point 422 increases. The capacitor recharges more slowly than it discharges (because of the steering diode which prevents reverse current flow in the transformer and thus increases its impedance), and thus, as indicated in FIG. 8c, the peaks of voltage to which point 422 returns decrease gradually until turn off of the SCR plus phase A, at which time point 422 begins to return to its normal or turn off level. The fluctuating voltage at point 422 provides current to the gate electrode of SCR 390, as indicated by the gate current waveform of FIG. 8d. The waveform has the desirable high current spike at its initiation, gradually diminishing to the end of the current pulse. Successive intermediate sustaining current pulses to the SCR gate electrode have a similar shape and also have successively declining peaks which follow the voltage fluctuations at point 422.

SUMMARY

The described system provides an emergency power supply of low cost and high efficiency, one which is readily adapted to retrofit an existing system. Although the described emergency system can be used in a wide variety of power supply applications, it is particularly applicable to retrofitting of a motor generator motor conditioning system. The system specifically cooperates with such a motor generator system by utilizing the ride-through time provided by inertia of the motor generator system to carry uninterrupted power to the load during the approximately 40–80 milliseconds of switching time of the emergency system. The system is readily applied to an existing power conditioning system and is truly a standby system, in that it is operable and draws power only when normal utility power fails. During normal utility power operation, the standby system requires power solely for its trickle charger and the minimal amount of power required for standby operation of the logic circuit. The inverters are disabled during normal power operation and draw no current. Although substantially completely inactive during normal operation, the system can be switched into operating mode without loss of power to a motor generator driven load, and, being synchronized to motor voltage during both normal operation and switching time, an inverter of minimum size can be employed. Being inactive during the normal operation of the main power lines, inefficiencies of a continuously operating in-line inverter, or comparable systems, are eliminated. Use of the described emergency power system allows the addition of other loads or other computers to an existing uninterruptible power supply system that may be operating at or near the limit of its capacity. No further or additional uninterruptible power supply with its relatively high cost is required to increase load handling capacity. It is only necessary to connect an emergency power system of the type described herein to those computers or other load devices supplied by motor generator conditioning systems, thereby freeing an existing, more expensive uninterruptible power supply, or at least some of its capacity, to handle additional load. The described system, because it is a true standby system and not required to operate continuously, as is a conventional on-line system, can be made considerably smaller and with less cost. Because of its small size, it can be installed in many different locations, even within the computer room itself and, accordingly, does not require separate building facilities.

The fact that the inverter operates only during an emergency simplifies the unit's design and virtually eliminates equipment heat loss as an environmental consideration. This also enables the major magnetics, including various transformers and inductors, to be made significantly smaller, because thermal loads are greatly decreased by the short operating periods. In fact, an inverter manufactured for such standby operation may be packaged within a space of 36 by 34 by 65 inches, whereas a continuously operable inverter of comparable power would require a space of 6 feet by 7 feet by 3 feet. The standby inverter draws no current, but its trigger generator tracks the motor voltage in phase and frequency, and the inverter can provide full output power with minimum inrush current within two cycles of the motor voltage following power line failure.

The foregoing detailed description is to be clearly understood as given by way of illustration and example only, the spirit and scope of this invention being limited solely by the appended claims.

What is claimed is:

1. A power supply system for a load that may be susceptible to malfunction on occurrence of a power failure, said power supply comprising
   a source of multi-phase line power,
   power conditioning means connected between said line power source and the load for providing power to the load during normal availability of line power, and for continuing to provide power to the load in the presence of a short period line power failure,
   a standby, off-line emergency power system including battery operated inverter means for providing multiphase power to said conditioning means, and
   emergency control means responsive to failure of said line power for disconnecting said line power source from said conditioning means and connecting said inverter means to said conditioning means, whereby the conditioning means will continue to provide power to the load.

2. The apparatus of claim 1 wherein said power conditioning means comprises a motor generator set having a motor connected to be operated by said line power source during normal availability of line power or by said inverter upon failure of line power, said motor generator set including a generator for providing power to said load during both normal availability and failure of line power.

3. The apparatus of claim 2 wherein said emergency control means comprises
   a set of normal contacts connected between said line power source and said conditioning means, said normal contacts being closed during supply of power from said source,
   a set of emergency contacts connected between said inverter and said conditioning means, said emergency contacts being open during supply of power from said source, and
   means responsive to failure of said line power source for opening said normal contacts and closing said emergency contacts.

4. The apparatus of claim 1 including means for holding said inverter means inactive during normal application of power from said source to said power conditioning means, and including means responsive to failure of said power source for initiating operation of said inverter.

5. An emergency power supply comprising
   a multiphase power source,
   a motor generator system connected to be driven by said power source and to provide power to a load during operation of said power source, and
   a standby, normally inactive emergency power supply comprising
      inverter means for generating multiphase power,
      means for sensing failure of said power source,
      control means responsive to said failure sensing means for holding said inverter in inactive condition during normal operation of said power source and for initiating operation of said inverter means in response to failure of said power source, and
      means responsive to said control means for disconnecting said power source from said motor generator and for coupling said inverter means to said motor generator to drive said motor generator system from said inverter means upon failure of said power source.

6. The method of supplying power to a load to provide load isolation from power supply disturbances and to provide standby, off-line emergency power, said method comprising the steps of
   supplying power to the load from a line power-driven motor generator while line power is available,
   connecting a first switching device between line power and said motor generator,
   connecting an auxiliary power-driven, multiphase inverter to said motor generator through a second switching device,
   closing said first switching device and opening said second switching device to operate said motor generator from said line power and to disconnect said inverter from said motor generator during normal operation of said line power,
   sensing failure of line power,
   opening said first switching device and closing said second switching device upon sensing of failure of line power, thereby to disconnect said motor generator from said line power and to connect said inverter to said motor generator, and
   continuing to supply power to the load from the line power-driven motor generator while said switching devices are being operated.

7. The method of claim 6 including the step of disabling operation of said inverter during supply of line power to said motor generator and initiating operation of said inverter when failure of said line power supply is sensed, and continuing to supply power to the load from the line power-driven motor generator while operation of said inverter is being initiated.

* * * * *